US012197618B2

(12) United States Patent
Agrawal et al.

(10) Patent No.: US 12,197,618 B2
(45) Date of Patent: *Jan. 14, 2025

(54) DATABASE LOG ANALYZER IN A CLOUD ENVIRONMENT USING MICROSERVICE ORCHESTRATION

(71) Applicant: Normalyze, Inc., Los Altos, CA (US)

(72) Inventors: Ajay Agrawal, Bangalore (IN); Yang Zhang, Fremont, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,391

(22) Filed: Dec. 18, 2023

(65) Prior Publication Data

US 2024/0394401 A1 Nov. 28, 2024

Related U.S. Application Data

(63) Continuation of application No. 18/207,656, filed on Jun. 8, 2023, now Pat. No. 11,886,610.

(30) Foreign Application Priority Data

May 23, 2023 (IN) .............................. 202311035748

(51) Int. Cl.
*G06F 21/62* (2013.01)
*G06F 16/9038* (2019.01)
*H04L 9/40* (2022.01)

(52) U.S. Cl.
CPC ...... *G06F 21/6227* (2013.01); *G06F 16/9038* (2019.01); *H04L 63/1425* (2013.01)

(58) Field of Classification Search
CPC .. G06F 21/62; G06F 21/6227; G06F 16/9038; H04L 9/40; H04L 63/1425; H04L 63/1458; H04L 63/1466
See application file for complete search history.

(56) References Cited

U.S. PATENT DOCUMENTS 10,642,990 B2   5/2020   Pattabhiraman et al.
11,012,452 B1 * 5/2021   Kats .................. G06F 16/252
(Continued)

FOREIGN PATENT DOCUMENTS

AU    2022200853 A1 * 3/2022 .............. G06F 11/34
CN       113792340 A  * 12/2021

OTHER PUBLICATIONS

MySQL Slow Query Log_ Comprehensive Guide on Tools and Tips, Percona blog, Mar. 14, 2014, 10 pgs.

*Primary Examiner* — Jayesh M Jhaveri
(74) *Attorney, Agent, or Firm* — Flagship Patents; Sikander M. Khan; Bruce A. Young

(57) ABSTRACT

The technology disclosed relates to analysis of security posture of a cloud environment. A computing system is configured to automatically discover a plurality of databases in the cloud environment and configure an orchestration engine to deploy a plurality of log analyzer microservices on the plurality of databases. Each log analyzer microservice, of the plurality of log analyzer microservices, is configured to scan a respective database log that represents database activities on a respective database of the plurality of databases. Analysis results are received from the plurality of log analyzer microservices. The analysis results represent detection of at least one of a performance criterion or a security criterion in one or more databases of the plurality of databases. An action signal representing the analysis results is generated.

20 Claims, 16 Drawing Sheets

(56) References Cited

U.S. PATENT DOCUMENTS

2016/0156655 A1* 6/2016 Lotem ................. H04L 63/1416
                                                              726/23
2017/0318027 A1* 11/2017 Rodniansky ........ H04L 63/1425
2022/0239681 A1* 7/2022 Newman ............. G06F 11/3006

* cited by examiner

Risk Signatures

Search... 🔍

Quick Filters: ☐Risk-chain ☐Monitoring ☐Compliance ☐Configuration ☐Activity ☐Anomaly search : signatureid :

750

| Name | Sig. id | Description | Tags |
|---|---|---|---|
| rds_table_with_sensitive_data_user_downloaded_more_than_1000_rows | 7022 | User downloaded more or equal to 1000 rows from a RDS table that contains sensitive data | aws rds +3 |

DATABASE LOG ANALYZER IN A CLOUD ENVIRONMENT USING MICROSERVICE ORCHESTRATION

CROSS-REFERENCE TO RELATED APPLICATIONS

The present application is a continuation of and claim priority to U.S. patent application Ser. No. 18/207,656, filed Jun. 8, 2023, which claims priority to Indian provisional application No. 202311035748, filed May 23, 2023, the contents of these applications are hereby incorporated by reference in their entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to analysis of security posture of a cloud environment. In particular, the disclosed technology relates to a system and method that detects a triggering criterion and, in response to the triggering criterion, automatically discovers a plurality of databases (DBs) in the cloud environment. An orchestration engine is configured to deploy a plurality of log analyzer microservices on the plurality of databases, each log analyzer microservice, of the plurality of log analyzer microservices, being configured to scan a respective database log that represents database activities on a respective database of the plurality of databases. Analysis results are received from the plurality of log analyzer microservices, the analysis results represent detection of at least one of a performance criterion or a security criterion in one or more databases of the plurality of databases. An action signal representing the analysis results is generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 9-1 and 9-2 (collectively referred to as FIG. 9) provide a flow diagram illustrating an example operation for streamlined analysis of data posture.

FIG. 12 illustrates one example of a risk signature.

DETAILED DESCRIPTION

Figure 1:
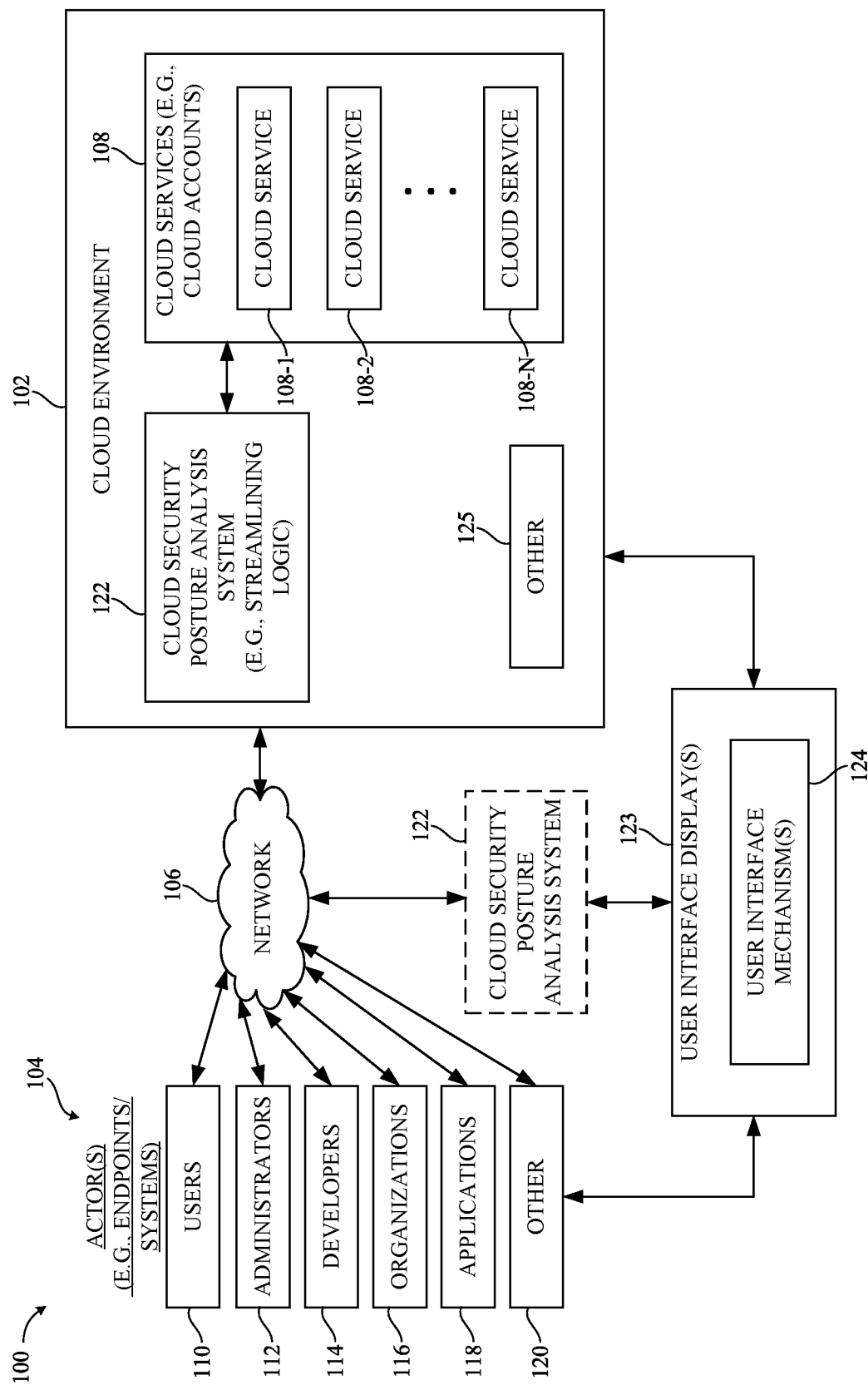
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present disclosure is directed to database log analytics in a cloud environment to monitor database activity for the security and/or performance improvement of databases in the cloud environment. The present system can ensure that users and applications, or other requestors that access the databases, are privileged, and the access is directed to the authorized data. Additionally, the present system can detect malicious queries, such as queries that can cause injection attacks. From a performance perspective, the present system can ensure that databases are in a healthy state, such as not being overloaded and execute queries or other access requests in a timely manner.

The present system can further detect risk signatures in the database activity, such as by identifying malicious or malformed queries that deviate significantly, e.g., a threshold distance from an expected form. Examples described herein perform database log analytics scanning and analytics and can co-relate the information obtained from multiple sources (e.g., user/privileges scan, data scan, etc.), in addition to obtaining query performance data that can be used to improve performance of the cloud environment databases.

One approach to database analytics relies on manual script generation and deployment for on-premise databases, where the database identification and access privilege requirements are relatively straightforward. The present system provides a database log analyzer in a cloud environment that facilitates continuous, parallel database log analysis in parallel, without manual intervention, or minimal manual intervention. The present system is therefore scalable as new databases are added in the cloud environment.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
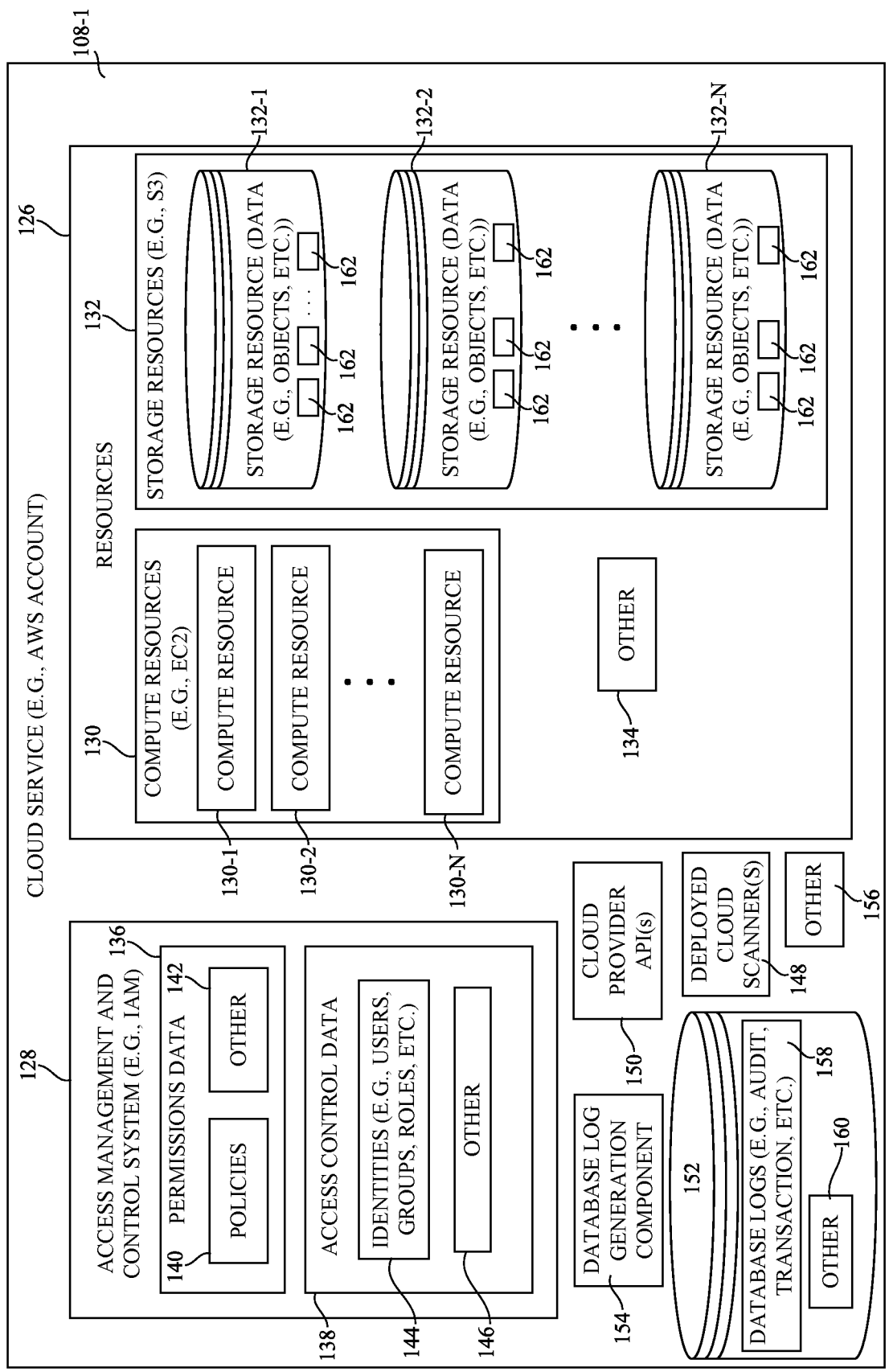
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, cloud provider application programming interface(s) (APIs) 150, a data store 152, a database log generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Database log generation component 154 is configured to generate database logs 158. Component 154, in one example, is configured to deploy a database log generator on each of a plurality of databases 162 on storage resources 132. Databases 162 can store information in any of a plurality of different types of structures. For example, some or all databases 162 can comprise structured query language (SQL) databases that store and organize data in tables with related information. Each table consists of rows and columns, with each row representing a record and each column representing a specific data field. SQL databases allow users to manipulate data through SQL commands. Some examples of SQL databases include MySQL and PostgreSQL, to name a few. Alternatively, or in addition, some or all databases 162 can include non-SQL databases.

The respective database log generator, for each respective database 162, generates a respective database log in database logs 158. An example database log includes log entries that record the database activities. Example database logs include, but not limited to, audit logs, transaction logs, etc. One particular example of a database log is a slow query log (e.g., MySQL slow query log) that records details of queries (e.g., SQL queries) that take longer than a specific threshold to execute. The logs facilitate identification of queries that are causing performance issues on a database server. A slow query log, in one example, stores information about the queries that took longer than the specified time to execute, including the time, the requestor (e.g., user, application, etc.) that executed the query, the duration of the query, the query statement, access permissions that were utilized, and other relevant details such as the host from which the query originated. The threshold, in one example, is dynamically adjustable and when the log is enabled and configured, the log generator writes the slow queries to data store 152. Using this information, a manual or automated process can be utilized to execute and optimize the queries to improve database performance. Further, the information in the log can be utilized to identify patterns in query behavior and identify opportunities to optimize database schema, indexing, and caching. Additionally, as discussed in further detail below, the query logs can be utilized to identify instances of risk criterion, such as database activities that match a predefined risk signature.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive.

Resources 126 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 108. For example, cloud provider APIs 150 can access database logs 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

For sake of illustration, but not by limitation, a service role can be assumed by an AWS service to perform actions on behalf of users. For instance, as a service that performs backup operations for a client, Amazon Data Lifecycle Manager requires that the client pass in a role to assume when performing policy operations on the client's behalf. That role must have an IAM policy with the permissions that enable Amazon Data Lifecycle Manager to perform actions associated with policy operations, such as creating snapshots and Amazon Machine Images (AMIs), copying snapshots and AMIs, deleting snapshots, and deregistering AMIs. Different permissions are required for each of the Amazon Data Lifecycle Manager policy types. The role must also have Amazon Data Lifecycle Manager listed as a trusted entity, which enables Amazon Data Lifecycle Manager to assume the role.

Figure 3:
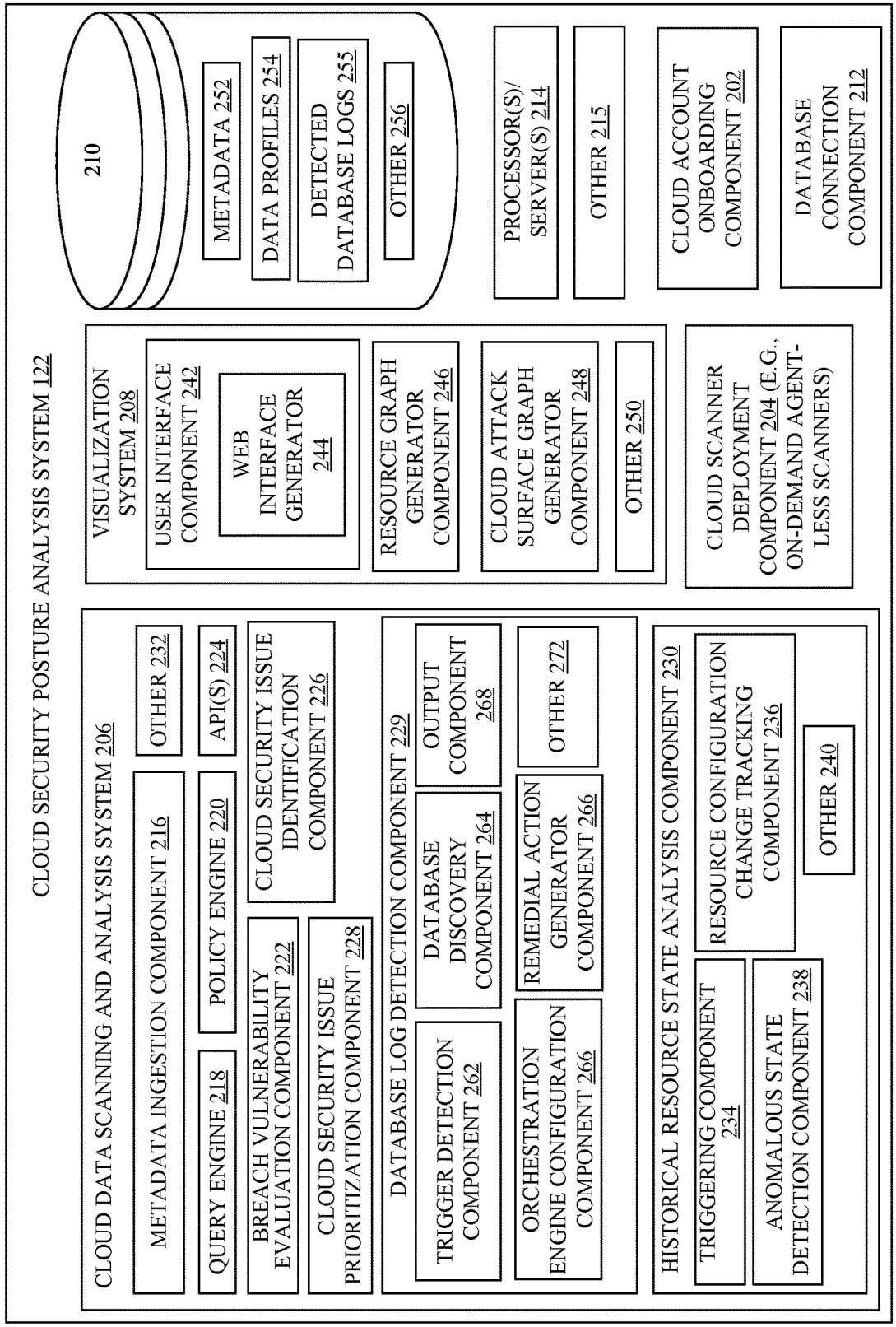
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on the resources 126 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, a database log detection component 229, a historical resource state analysis component 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Historical resource state analysis component 230 is configured to analyze a history of states of resources 126. Historical resource state analysis component 230 includes a triggering component 234 configured to detect a trigger that to perform historical resource state analysis. Triggering component 234 is configured to identify an event that triggers component 230 to analyze the state of resources 126. The event can be, for example, a user input to selectively trigger the analysis, or a detected event such as the occurrence of a time period, an update to a resource, etc. Accordingly, historical resource state can be tracked automatically and/or in response to user input.

Historical resource state analysis component 230 includes a resource configuration change tracking component 236 configured to track changes in the configuration of resources 126. Component 230 also includes an anomalous state detection component 238, and can include other items 240 as well. Component 238 is configured to detect the occurrence of anomalous states in resources 126. A resource anomaly can be identified where a given resource has an unexpected state, such as a difference from other similar resources identified in the cloud service.

Visualization system 208 is configured to generate visualizations of the cloud security posture from system 206. Illustratively, system 208 includes a user interface component 242 configured to generate a user interface for a user, such as an administrator. In the illustrated example, component 242 includes a web interface generator 244 configured to generate web interfaces that can be displayed in a web browser on a client device.

Visualization system 208 also includes a resource graph generator component 246, a cloud attack surface graph generator component 248, and can include other items 250 as well. Resource graph generator component 246 is configured to generate a graph or other representation of the relationships between resources 126. For example, component 246 can generate a cloud infrastructure map that graphically depicts pairs of compute resources and storage resources as nodes and network communication paths as edges between the nodes.

Cloud attack surface graph generator component 248 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 252 obtained by metadata ingestion component 216, sensitive data profiles 254, detected database logs 255, and can store other items 256 as well. Examples of sensitive data profiles 254 are discussed in further detail below. Briefly, however, sensitive data profiles 254 can identify target data patterns that are to be categorized as sensitive or conforming to a predefined pattern of interest. Sensitive data profiles 254 can be used as training data for data classification performed by database log detection component 229. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Data schema records store detected instances of the target data profiles or entities that are returned based on content-based classification of the cloud data. An example detected data schema record can store any of a variety of different data items representing the detected instance corresponding to the data record, including, but not limited to, a data store identifier, a database identifier, a table name identifier, a column name identifier, a column type identifier, a target data entity identifier, and/or a confidence score, among other data. A data store identifier identifies a particular data store that contains the detected instance of the target data profiles. A database identifier identifies a particular database, in the particular data store, that contains the detected instance of the target data profiles. A table name identifier identifies a particular table, in the particular database, that contains the detected instance of the target data profiles. A column name identifier identifies the column name associated with a particular column that contains the detected instance of the target data profiles. A column type identifier identifies a data type (e.g., date, integer, timestamp, character string, decimal, etc.). A target data entity identifier identifies the target data profile that was matched in the detected instance. A confidence score identifies a confidence associated with the classification.

Database connection component 212 is configured to connect to, or access, databases in the data stores of the resources being analyzed by system 122. Examples are discussed in further detail below. Briefly, however, database connection component 212 can receive user access credentials, such as a username and password, for each database of a plurality of databases to be accessed in the cloud environment and scanned by the deployed scanners. In another example, database connection component 212 can be configured to connect to representations of the databases that are accessed using a different authentication requirement, than the databases themselves. For example, database connection component 212 can identify and connect to snapshots of the databases through cloud provider APIs 150, discussed above. Database connection component 212 can access database logs 158, for the identified databases, from data store 152.

As illustrated in FIG. 3, database log detection component 229 includes a trigger detection component 262, a database discovery component 264, an orchestration engine configuration component 266, an output component 268, a remedial action generator component 270, and can include other items 272 as well.

An example operation of database log detection component 229 is discussed in further detail below. Briefly, however, trigger detection component 262 is configured to detect a trigger to perform database log detection. In response, orchestration engine configuration component 266 configures an orchestration engine to deploy, in parallel, a plurality of microservices to analyze the database logs (referred to herein as log analyzer microservices).

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that deployable and scalable independently of other services.

The deployed log analyzer microservices return analysis results to the orchestration engine deployed by component 229, which stores the results in a data store, such as data store 152. The results can be stored in any of a number of forms. In one example, a semantic graph database is created that stores, manages, and queries interconnected data. One example is a GraphDB database that is based on a resource description framework data model and supports SPARQL query language to retrieve and manipulate data stored in the graph. Alternatively, or in addition, a time-series database (TSDB) is used and stores the data as a time-stamp or time-series data, including a sequence of data points that are captured in regular intervals over time.

Output component 268 can output the analysis results to other systems. In one example, alerts or user interface displays, such as reports, can be provided to an administrator or other user.

Remedial action generator component 270 is configured to generate a remedial action that can be output to an administrator or user as a suggested action. Alternatively, or in addition, component 270 can generate control signals that perform the remedial action within the cloud environment. Examples are discussed in further detail below.

Figure 4:
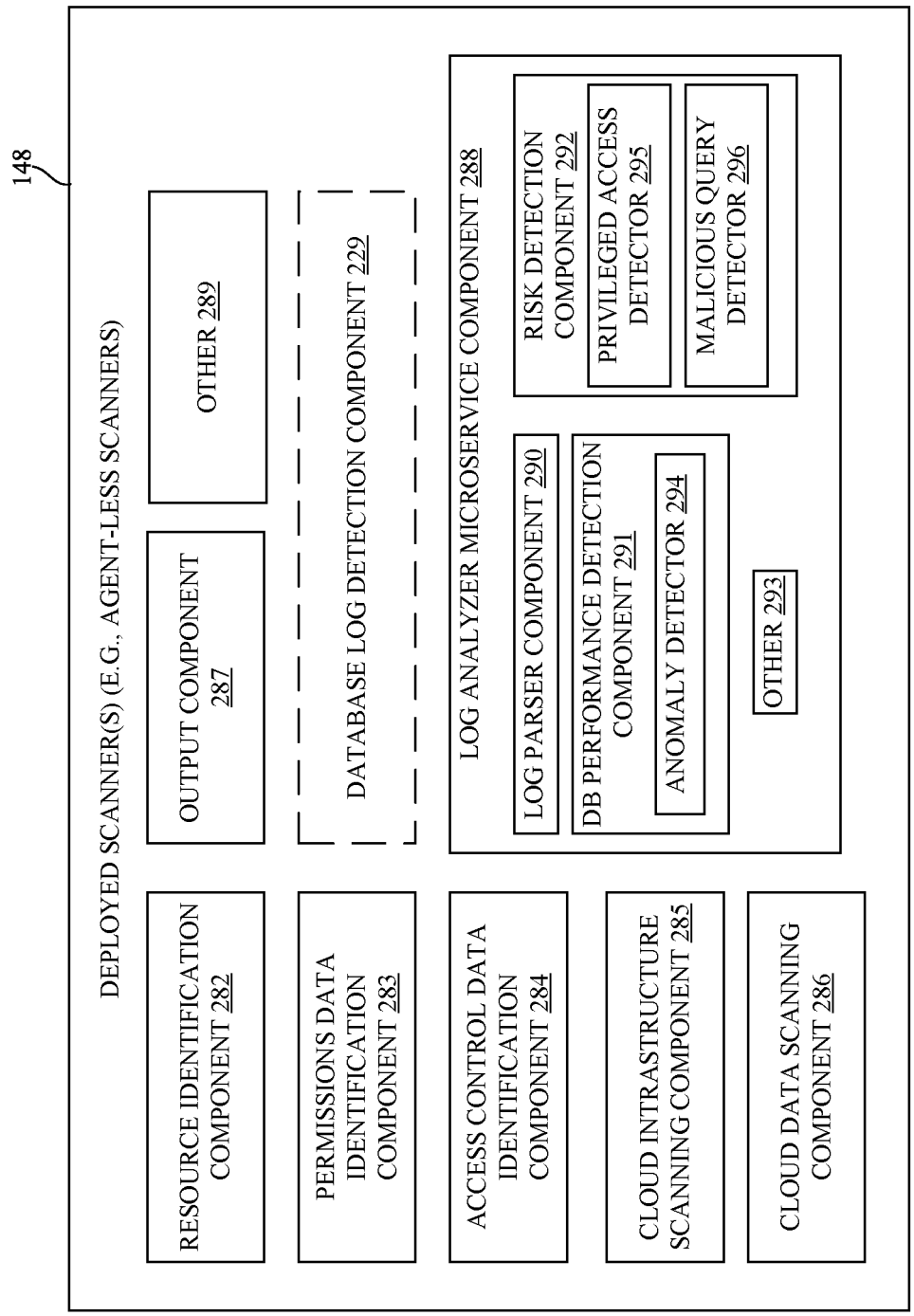
FIG. 4 is a block diagram illustrating one example of a deployed scanner.

FIG. 4 is a block diagram illustrating one example of a deployed scanner 148. Scanner 148 includes a resource identification component 282, a permissions data identification component 283, an access control data identification component 284, a cloud infrastructure scanning component 285, a cloud data scanning component 286, an output component 287, a log analyzer microservice component 288, and can include other items 289 as well. FIG. 4 also illustrates that some or all components of and/or functionality performed by database log detection component 229 can be on or otherwise associated with deployed scanner 148.

Resource identification component 282 is configured to identify the resources 126 within cloud service 108-1 (and/or other cloud services 108) and to generate corresponding metadata that identifies these resources. Permissions data identification component 283 identifies the permissions data 136 and access control data identification component 284 identifies access control data 138. Cloud infrastructure scanning component 285 scans the infrastructure of cloud service 108 to identify the relationships between resources 130 and 132 and cloud data scanning component 286 scans the actual data stored in storage resources 132. Output component 287 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Log analyzer microservice component 288 includes a log analyzer microservice that is employed and managed by an orchestration engine, as discussed above. Operation of the microservice is discussed in further detail below. Briefly, however, component 288 includes a log parser component 290, a database performance detection component 291, a risk detection component 292, and can include other items 293 as well. Log parser component 290 is configured to parse database logs in a given database on which the scanner is deployed. The parsing can be done in any of a number of ways. In one example, log parser component 290 accesses each of a number of entries in the database log (e.g., a slow query log), and identifies constituent data fields that identify various characteristics or parameters from a respective database activity. For example, the parsing can include an identification of what data was accessed, the requestor that requested access to the data, permissions that were used to request the access, a time at which the access occurred or was requested, as well as any other information that may be stored in the database log.

Database performance detection component 291 is configured to generate an indication of database performance based on the database log parsed by log parser component 290. For example, one or more performance criterion can be used in analyzing the database. The performance can indicate any of a number of criterion such as, but not limited to, a latency, a throughput, an operation time for the database activities relative to a threshold, etc. In one example, component 291 includes an anomaly detector 294 configured to detect anomalies in the database activities. Illustratively, a database anomaly includes database behavior that deviates from an expected behavior by a predefined or dynamic threshold, and can be considered an unexpected or undesirable behavior that occurs on the database due to, for example, the design or structure of the database, a usage of the database, etc. Anomalies can lead to incorrect or inconsistent data, which can cause problems for users and applications, or other requestors, that reply on the database. Some examples include insertion anomalies, deletion anomalies, and update anomalies. In one example, component 291 is configured to identify query performance and anomaly detector 294 can identify queries that take longer than a threshold amount of time to execute, repeatedly execute more than a threshold number of times, etc.

Risk detection component 292 is configured to identify security risks based on the database log. In one example, risk detection component 292 can apply a set of risk criterion, such as one or more risk signatures, against the database behavior to identify one or more instances of the risk criterion. In one example, risk detection component 292 includes a privileged access detector 295 and a malicious query detector 296. Privileged access detector 295 is configured to determine whether requested accesses to the database included appropriate privileges, that is whether the requested access by particular requestors were unprivileged or underprivileged. Such access requests can indicate, for example, surreptitious activities against the database. Malicious query detector 296 is configured to detect malicious queries that were executed, or attempted to be executed, against the database. A malicious query includes, for example, queries that have an unexpected form or process against the database. In one example, a malicious query comprises a query that executes more than a threshold number of times against sensitive data in the database. This, of course, is for sake of example only.

Figure 5:
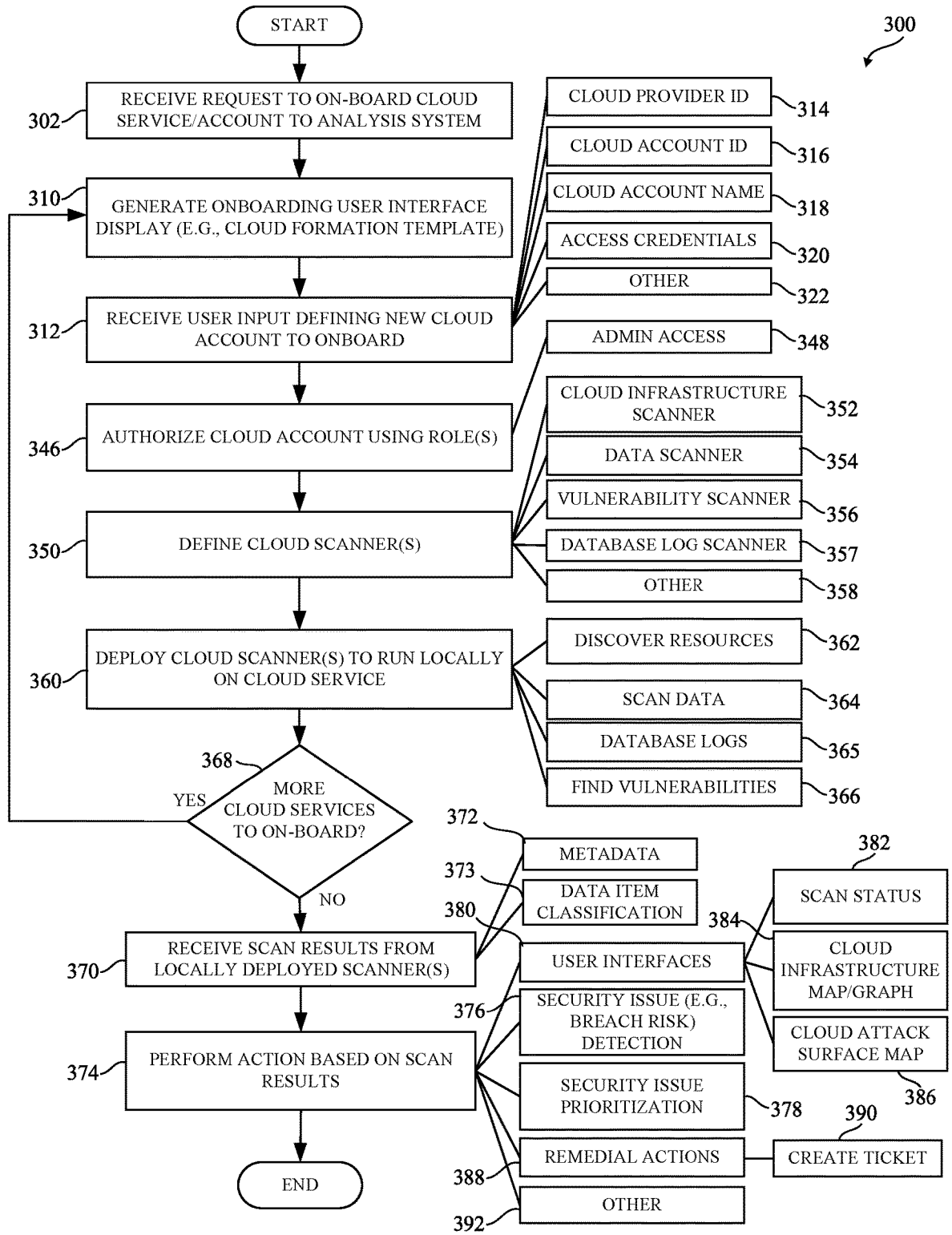
FIG. 5 is a flow diagram showing an example operation of on-boarding a cloud account and deploying one or more scanners.

FIG. 5 is a flow diagram 300 showing an example operation of system 122 in on-boarding a cloud account and deploying one or more scanners. At block 302, a request to on-board a cloud service to cloud security posture analysis system 122 is receives. For example, an administrator can submit a request to on-board cloud service 108-1.

Figure 6:
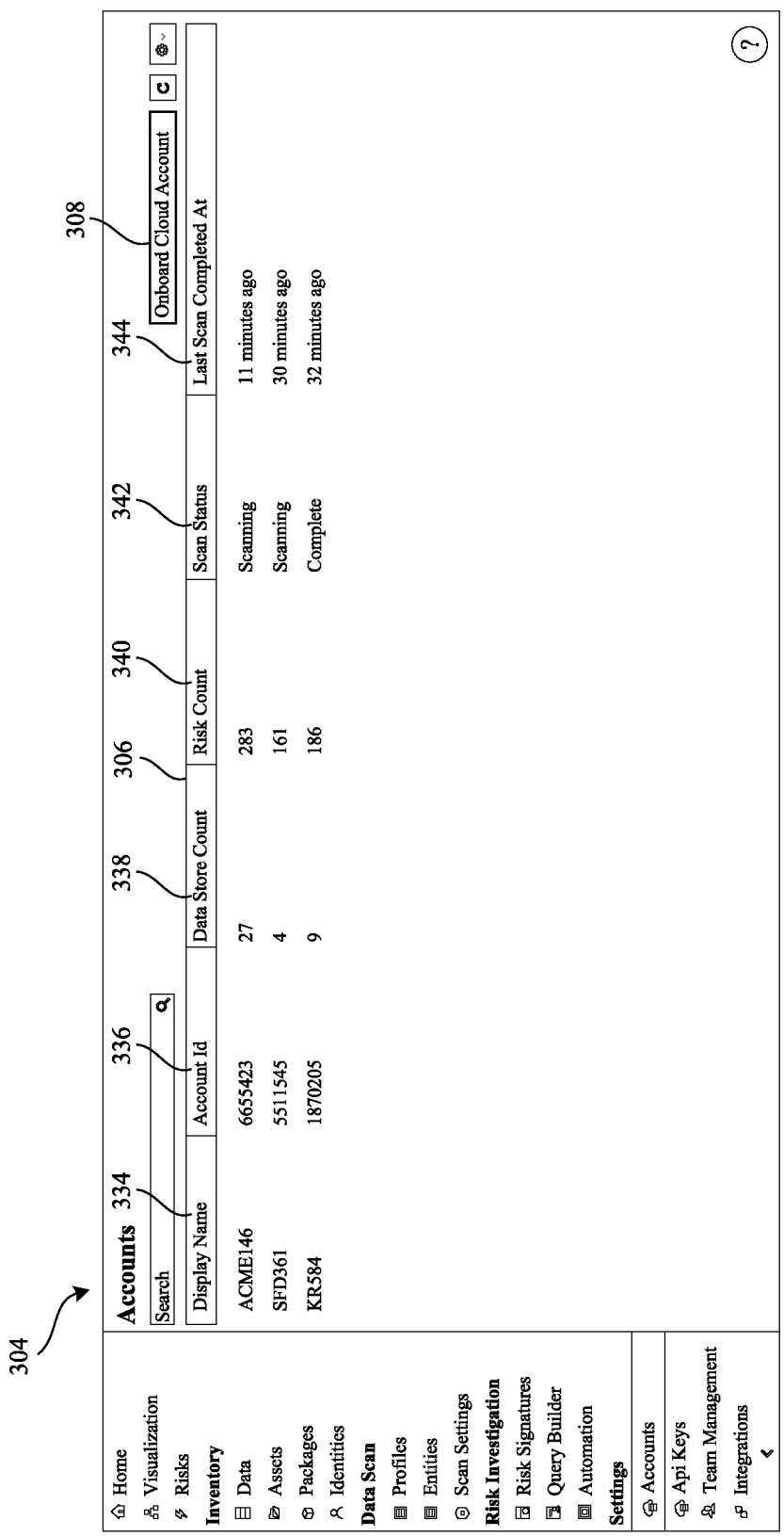
FIG. 6 illustrates one example of a user interface display representing on-boarded cloud accounts.

FIG. 6 illustrates one example of a user interface display 304 provided for an administrator. Display 304 includes a display pane 306 including a number of display elements representing cloud accounts that have been on-boarded to system 122. Display 304 includes a user interface control 308 that can be actuated to submit an on-boarding request at block 302.

Referring again to FIG. 5, at block 310, an on-boarding user interface display is generated. At block 312, user input is received that defines a new cloud account to be on-boarded. The user input can define a cloud provider identification 314, a cloud account identification 316, a cloud account name 318, access credentials to the cloud account 320, and can include other input 322 defining the cloud account to be on-boarded.

Figure 7:
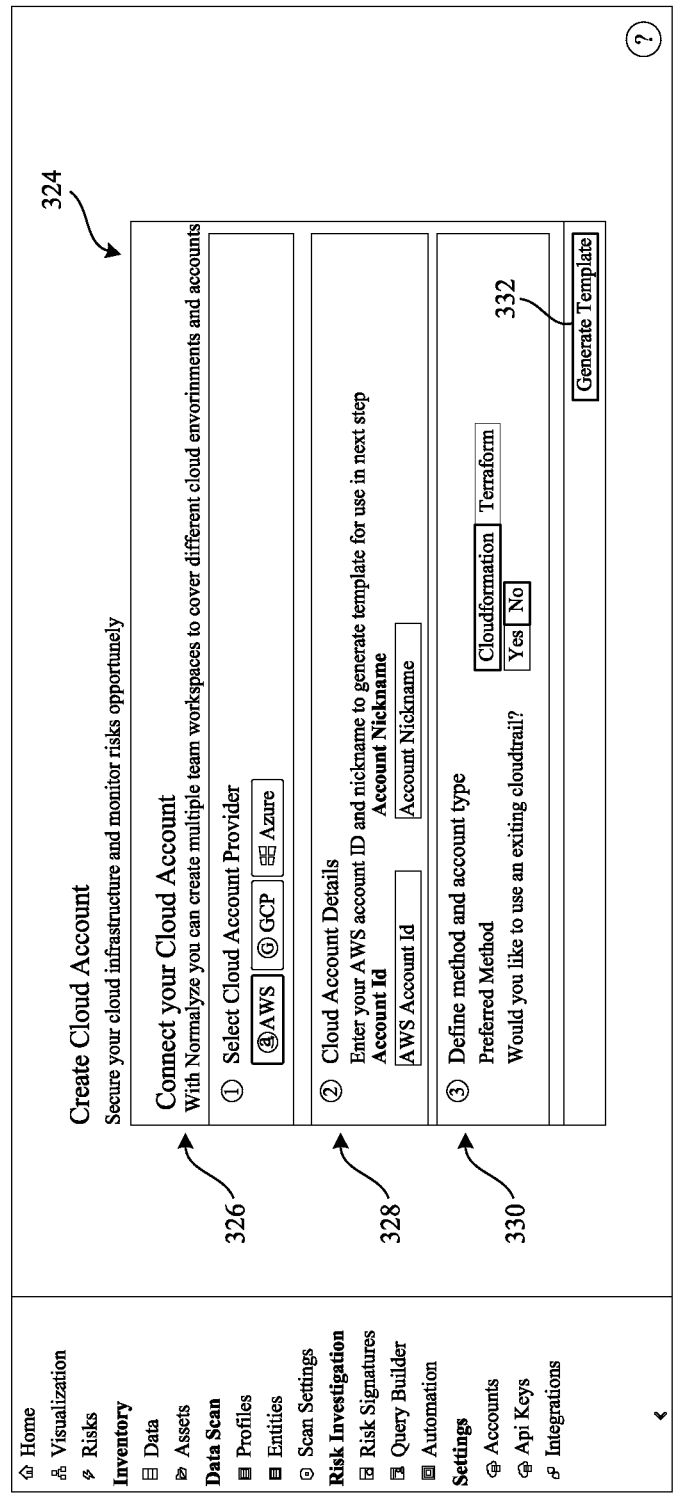
FIG. 7 illustrates one example of an on-boarding user interface display.

FIG. 7 illustrates one example of an on-boarding user interface display 324 that is displayed in response to user actuation of control 308.

Display 324 includes a user interface mechanism 326 configured to receive input to select or otherwise define a particular cloud account provider. In the illustrated example, mechanism 326 includes a plurality of selectable controls representing different cloud providers including, but not limited to, AWS, GCP, Azure.

Display 324 includes a user input mechanism 328 configured to receive input defining a cloud account identifier, and an account nickname. User input mechanisms 330 allow the user to define other parameters for the on-boarding. A user input mechanism 332 is actuated to generate a cloud formation template, or other template, to be used in the on-boarding process based on the selected cloud account provider.

Once the cloud account is connected to system 122, display 304 in FIG. 6 can be updated to show the details of the cloud account as well as the scan status. In FIG. 6, each entry includes a display name 334, an account ID 336, a data store count 338, and a risk count 340. Data store count 338 includes an indication of the number of data stores in the cloud account and the risk count 340 includes an indication of a number if identified security risks. A field 342 indicates the last scan status, such as whether the last scan has completed or whether the scanner is currently in progress or currently scanning. A field 344 indicates the time at which the last scan was completed.

Referring again to FIG. 5, at block 346, the cloud account is authorized using roles. For example, administrator access (block 348) can be defined for the cloud scanner using IAM roles. One or more cloud scanners are defined at block 350 and can include, but are not limited to, cloud infrastructure scanners 352, cloud data scanners 354, vulnerability scanners 356, database log scanners 357, or other scanners 358.

At block 360, the cloud scanners are deployed to run locally on the cloud service, such as illustrated in FIG. 2. The cloud scanners discover resources at block 362, scan data in the resources at block 364, database logs at block 365, and can find vulnerabilities at block 366. As discussed in further detail below, a vulnerability can identified based on finding a predefined risk signature in the cloud service resources. The risk signatures can be queried upon, and define expected behavior within the cloud service and locate anomalies based on this data.

At block 368, if more cloud services are to be on-boarded, operation returns to block 310. At block 370, the scan results from the deployed scanners are received. As noted above, the scan results include metadata (block 372) and/or data item classifications (block 373) generated by the scanners running locally on the cloud service.

At block 374, one or more actions are performed based on the scan results. At block 376, the action includes security issue detection. For example, a breach risk on a particular resource (such as a storage resource storing sensitive data) is identified. At block 378, security issue prioritization can be performed to prioritize the detected security issues. Examples of security issue detection and prioritization are discussed in further detail below. Briefly, security issues can be detected by executing a query against the scan results using vulnerability or risk signatures. The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

The action can further include providing user interfaces at block 380 that indicate the scan status (block 382), a cloud infrastructure representation (such as a map or graph) (block 384), and/or a cloud attack surface representation (map or graph) (block 386). The cloud attack surface representation can visualize vulnerabilities.

Remedial actions can be taken at block 388, such as creating a ticket (block 390) for a developer or other user to address the security issues. Of course, other actions can be taken at block 392. For instance, the system can make adjustments to cloud account settings/configurations to address/remedy the security issues.

Figure 8:
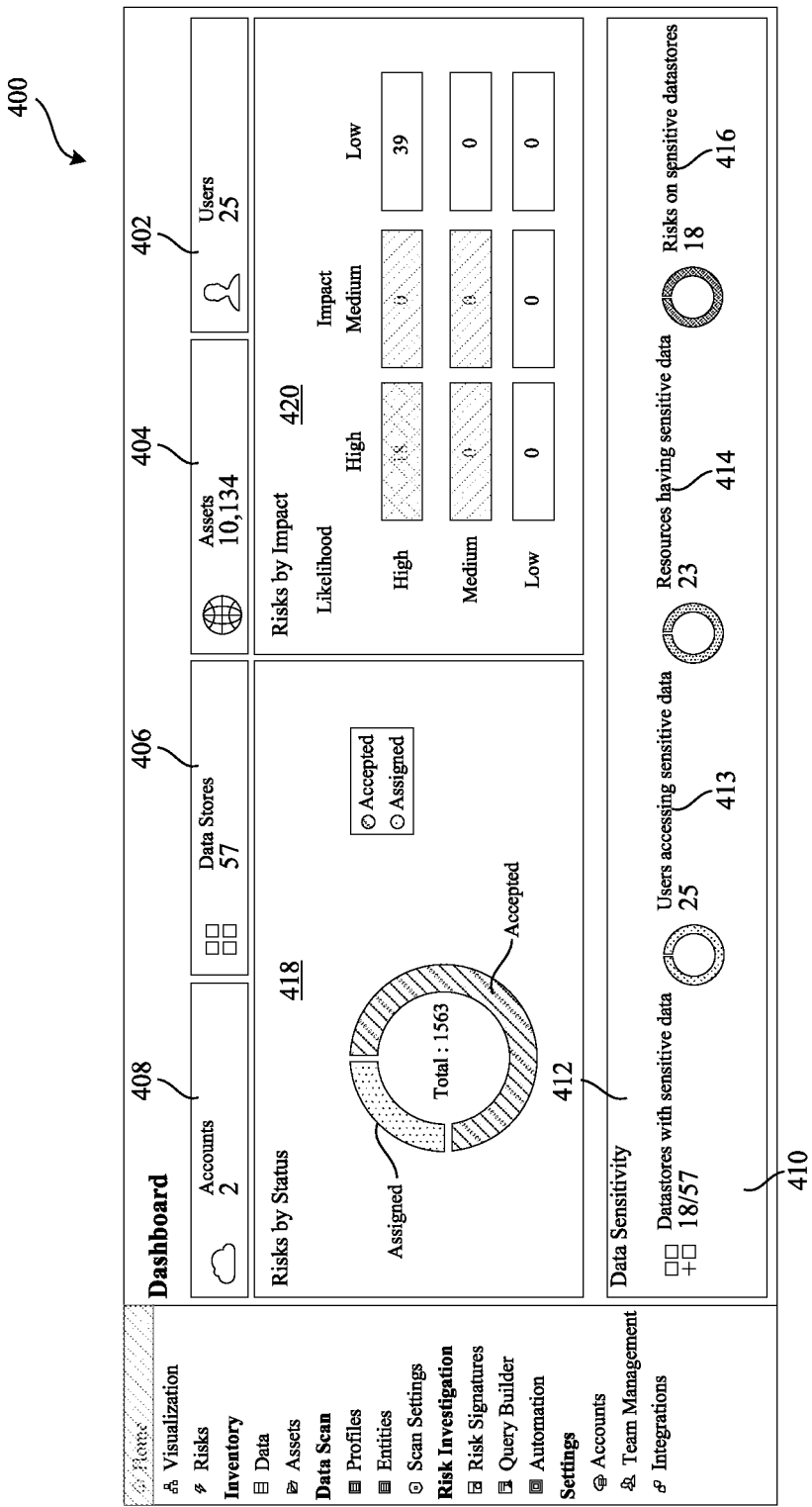
FIG. 8 illustrates one example of a user interface display having a dashboard representing on-boarded cloud service accounts.

FIG. 8 illustrates one example of a user interface display 400, that can be displayed at block 376. Display 400 provides a dashboard for a user which provides an overview of on-boarded cloud service accounts. The dashboard identifies a number of users 402, a number of assets 404, a number of data stores 406, and a number of accounts 408. A data sensitivity pane 410 includes a display element 412 that identifies a number of the data stores that include sensitive data, a display element 413 that identifies a number of users with access to the sensitive data, a display element 414 that identifies a number of resources having sensitive data, and a display element 416 that identifies a number of risks on the data stores having sensitive data. Further, graphs or charts can be generated to identify those risks based on factors such as status (display element 418) or impact (display element 420).

Display element 420 illustratively categorizes the risks based on impact as well as the likelihood of occurrence of those risks. Risk categorization is discussed in further detail below. Briefly, however, display element 420 stratifies one or more of breach likelihood scores or breach impact scores categories representing different levels of severity, such as high, medium, and low severity levels. In one example, display element 420 is color coded based on the degree of impact of the risk (e.g., high impact is highlighted in red, medium impact is highlighted in yellow, and low impact is highlighted in green).

Figures 1, 9:
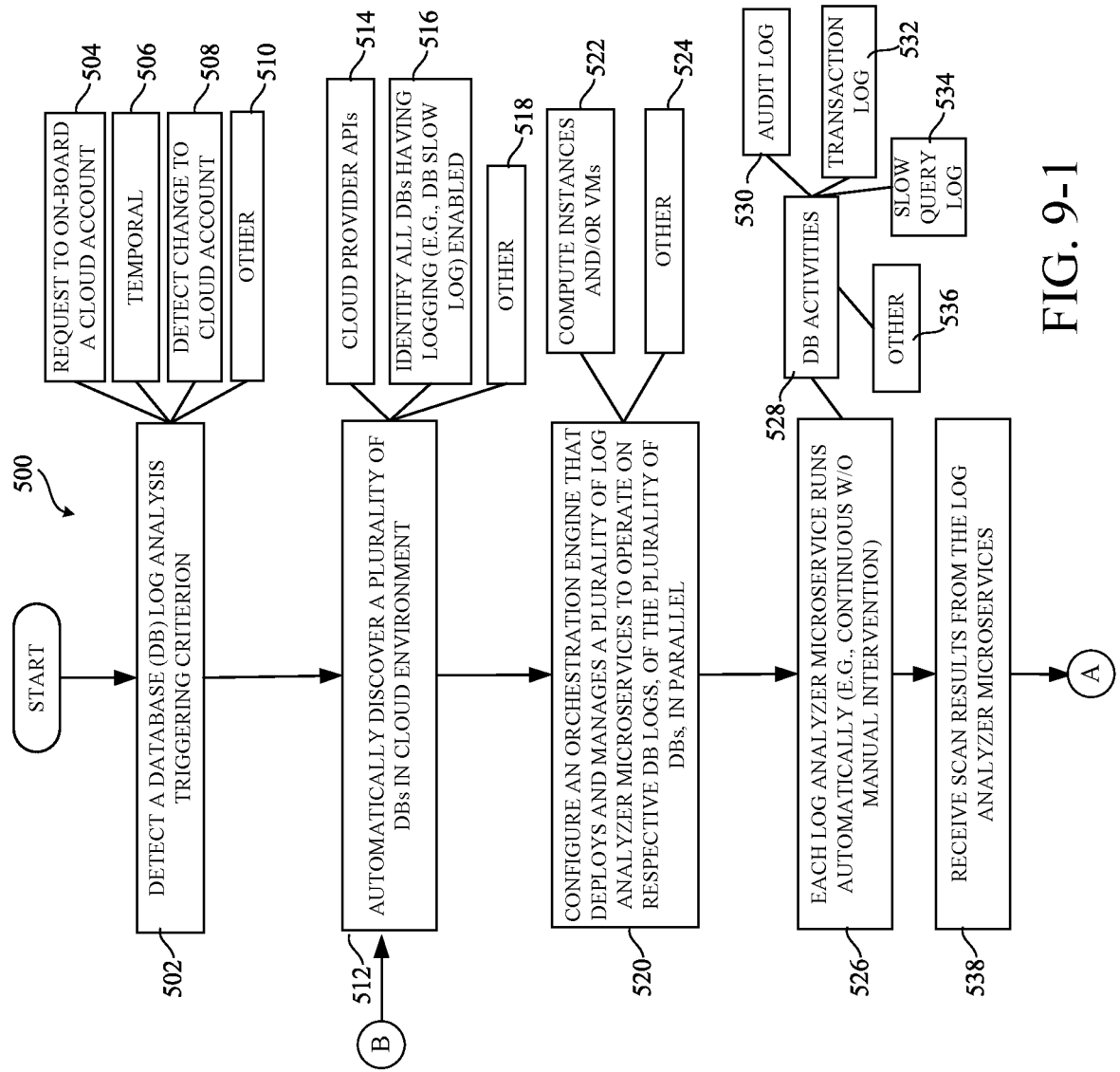
Figures 2, 9:
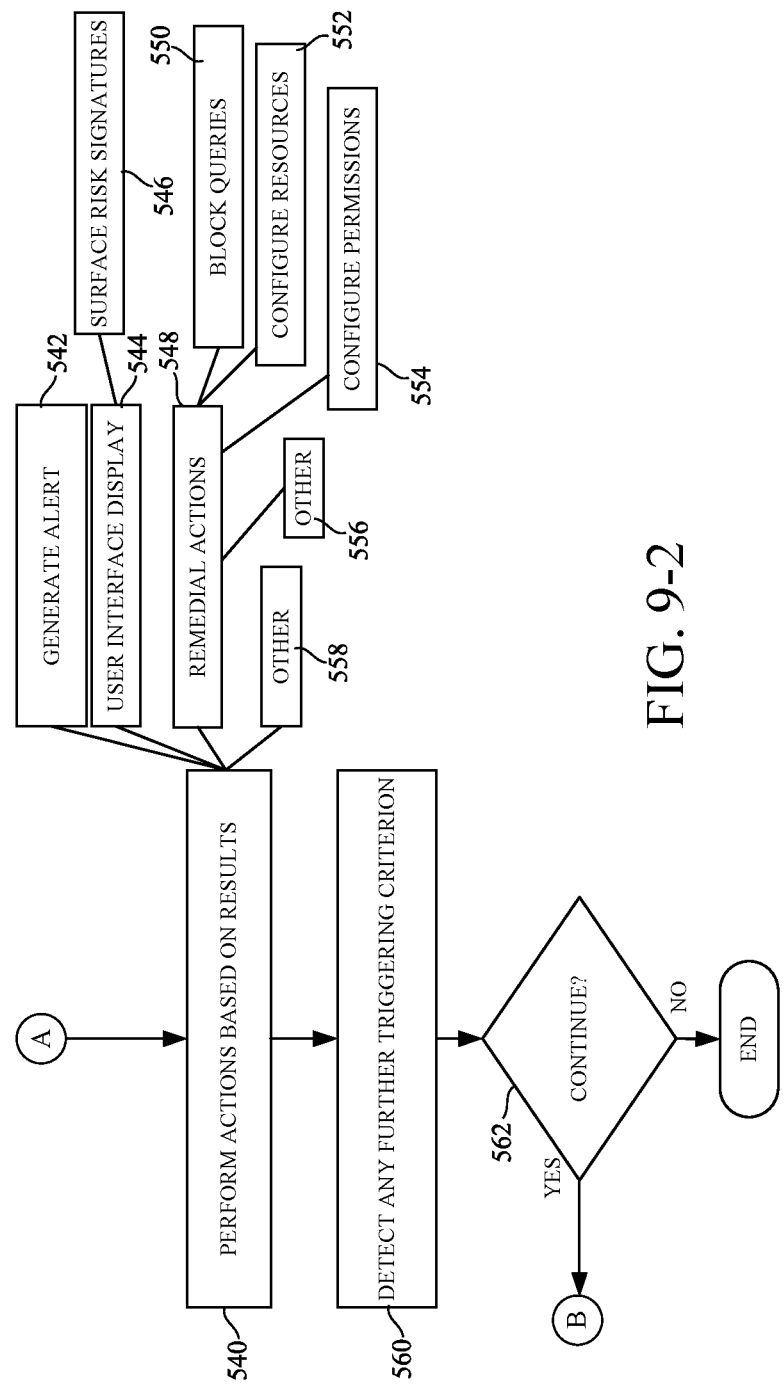

FIGS. 9-1 and 9-2 (collectively referred to as FIG. 9) provide a flow diagram 500 illustrating an example operation of data posture analysis in a cloud environment. For sake of illustration, but not by limitation, FIG. 9 will be discussed in the context of database log detection component 229 illustrated above in FIG. 3.

At block 502, trigger detection component 262 detects a database log analysis triggering criterion. The triggering criterion can include any of a number of criterion including, but not limited to, a request to on-board a cloud account (block 504), a temporal criterion (block 506), a change to the cloud account (block 508), or other criterion (block 510). A request to on-board a cloud account can be received by a user through a user interface, such as FIG. 7 discussed above. The temporal criterion at block 506 can indicate a time at which the database log analysis is to be triggered for execution on one more databases 162. In this way, the database log analysis can be performed iteratively over time to detect and analyze a collection of databases, dynamically, as they may change over time.

At block 508, component 262 can receive an indication of a change to the cloud account, such as that one or more new databases have been added, one or more databases have been removed, one or more databases have been changed, etc.

In any case, in response to the triggering criterion, at block 512 database discovery component 264 automatically discovers a plurality of databases in the cloud environment. In one example, database discovery component 264 utilizes cloud provider application programming interfaces (APIs) at block 514 to discover the databases in the cloud environment, or a portion of the cloud environment such as within a particular cloud account. Alternatively or in addition, at block 516 component 264 identifies all databases that have logging enabled. For example, this discovery can include identifying which databases have slow logging enabled. Of course, the databases can be discovered in other ways as well, as represented at block 518.

At block 520, orchestration engine configuration component 266 configures an orchestration engine that deploys and manages a plurality of log analyzer microservices to operate on respective database logs of the plurality of database logs discovered at block 512. Illustratively, the log analyzer microservices are deployed and managed in parallel, so that some or all of the databases can be analyzed at the same time. In one example, configuration of the orchestration engine configures one or more compute instances (and/or virtual machines) to deploy and manage the microservices, which is represented at block 522. Of course, the configuration engine can be configured in other ways as well, as represented at block 524.

At block 526, each log analyzer microservice automatically runs on the database log. Illustratively, each log analyzer microservice executes continuously without manual intervention to discover and scan the database logs.

A database log analyzer microservice fetches, parses, and analyzes the database logs that represent database activities at block 528. For example, a database log can include an audit log (block 530), a transaction log (block 532) and/or a slow query log (block 534). Of course, other types of database logs (block 536) can be scanned as well.

Figure 10:
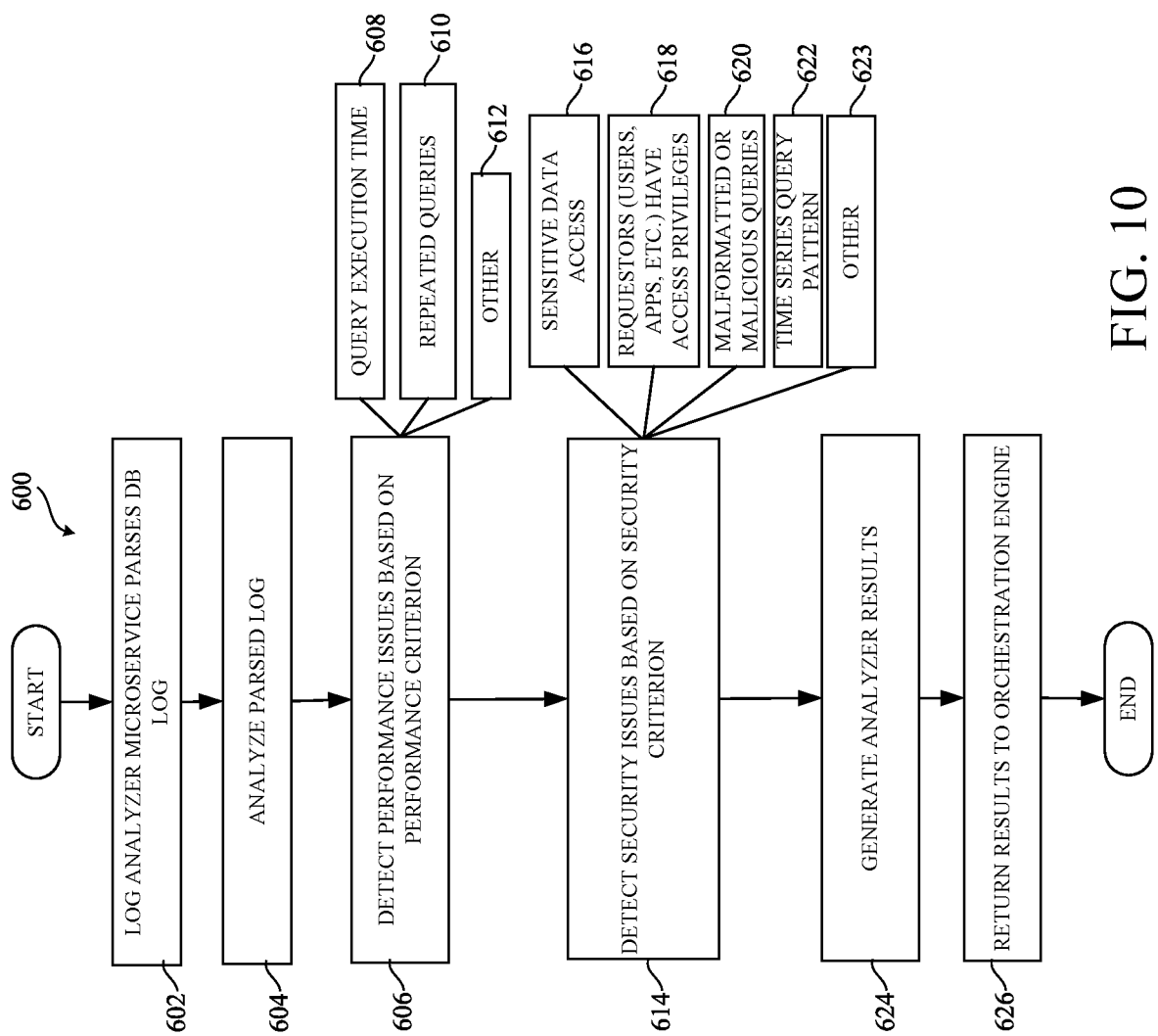
FIG. 10 provides a flow diagram illustrating an example operation of a log analyzer microservice.

FIG. 10 is a flow diagram 600 illustrating one example of a log analyzer microservice running on a database. At block 602, the log analyzer microservice parses the database log and, at block 604, analyzes the parsed log. The microservice detects performance issues at block 606 based on one or more performance criteria. For example, detection of performance issues can include analyzing the parsed log to identify query execution time at block 608, the execution of repeated queries at block 610, or other performance criterion at block 612.

At block 614, security issues can be detected based on one more security criteria. For example, at block 616, sensitive data accesses can be identified based on an identification that the target data being accessed conforms to a sensitive data profile. At block 618, the microservice can determine that the requestor (such as a user, application) has appropriate access privileges based on the target data being accessed. At block 620, the microservice can identify malformed or malicious queries. At block 622, the microservice can identify a time series pattern of queries representing at least one of a query count, a query type, or a query user that submitted queries in a set of queries. For instance, in each time window, of a plurality of time windows, the microservice identifies query characteristics, such as how many queries are executed, what kind of queries are executed, who issued the query, etc. Of course, other security issues can be identified at block 623.

Analyzer results are generated at block 624 and returned to the orchestration engine at block 626.

Referring again to FIG. 9, at block 538 the scan results are received by the orchestration engine from the plurality of log analyzers. Database log detection component 229, or other components of cloud security posture analysis system 122, perform actions at block 540 based on the results. For example, but not by limitation, output component 268 can generate an alert at block 542 and/or a user interface display at block 544. For example, at block 546, a user interface display can surface detected instances of risk signatures.

Figure 11:
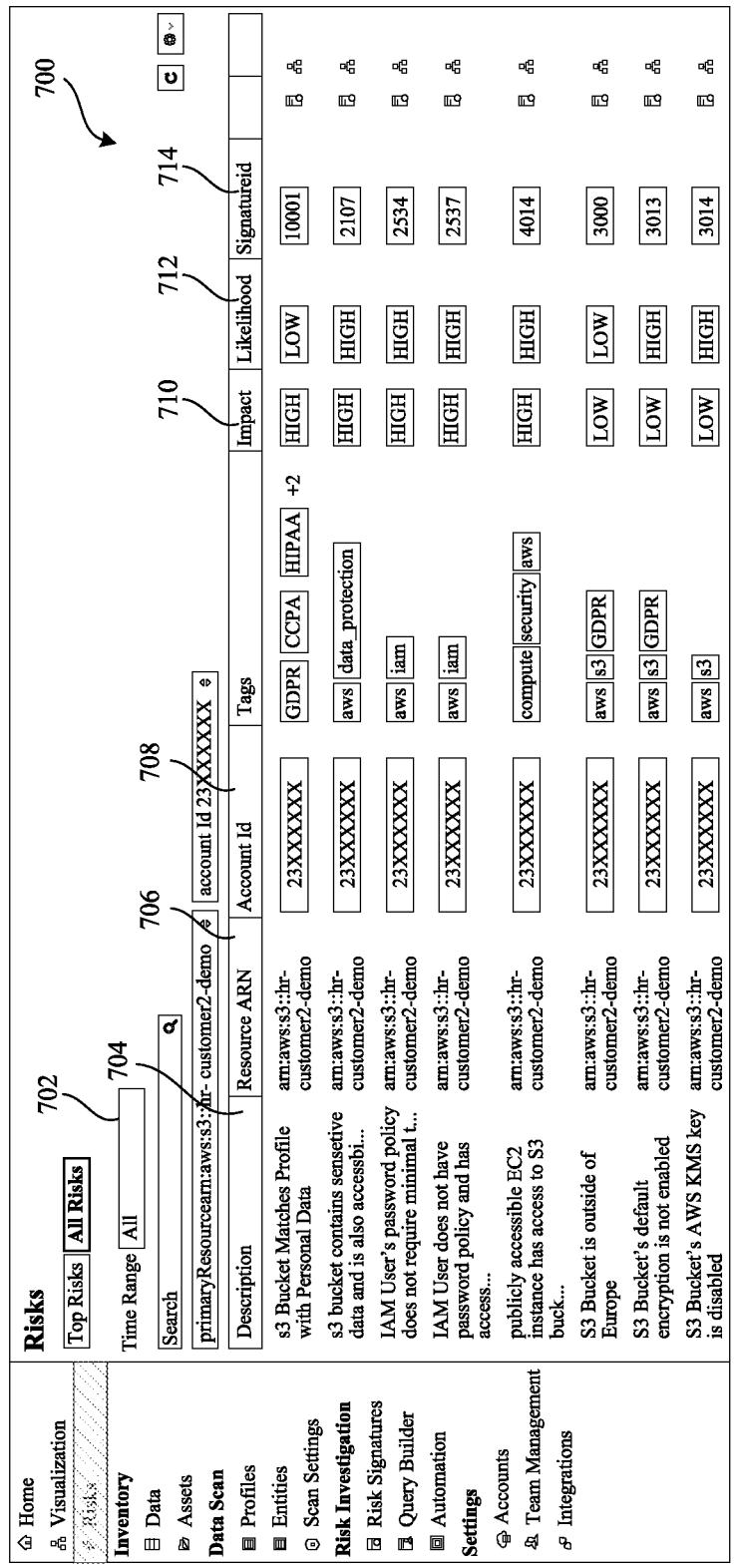
FIG. 11 illustrates one example of a user interface display that graphically depicts vulnerability risks.

FIG. 11 illustrates one example of a user interface display 700 that graphically depicts vulnerability risks, in tabular form. Display 700 can include a time range user input mechanism 702 configured to specify a time range for visualizing risks, a description field 704, a resource identifier field 706, and an account identifier field 708. Display 700 can also include an impact field 710, a likelihood field 712, and a signature identification field 714. Display 700 is configured to visualize instances of risks that meet a predefined risk signature.

FIG. 12 illustrates one example of a risk signature 750. Detected instances of risk signature 750 can be displayed in user interface display 700 for example. Risk signature 750 includes one or more fields that provide an identification and definition of the risk signature, that can be matched against database activities in the database logs. For example, the risk signature can include a textual name identifier stored in field 752, and/or a numerical identifier stored in field 754. One or more of the identifiers can include a global unique identifier (GUID) that uniquely identifies the risk signature.

A description field 756 can provide a user-readable textual description of the signature. In the present example, the risk signature defines instances in which a requestor (a user, application, etc.) downloading one thousand rows, or more, of sensitive data from a table in the database. If instances of risk signature 750 are matched by the log analyzer, the results are returned to the user as vulnerability risks.

Alternatively, or in addition, remedial actions can be identified and executed at block 548. For example, a remedial action can include, but is not limited to, blocking queries at block 550, configuring the resources at block 552, configuring permissions of the resources at block 554, or other actions represented at block 556. Of course, other types of actions can be performed at block 558.

Referring to FIG. 9, at block 560 the trigger detection component 262 can determine whether any further triggering criterion are detected to indicate further analysis of the databases in the cloud environment at block 562. If so, the operation can return to block 512.

It can thus be seen that the present disclosure provides technology for data security posture analysis of a cloud environment. In some described examples, the technology provides an automated and scalable approach for discovering database logs that log database activities in one or more cloud accounts. In this way, the log analyzer is not susceptible to manual scripting errors and/or the failure to identify at least some of the databases in the cloud environment to be analyzed. In addition to query performance, the present technology can also identify security concerns in the databases, such as by co-relating the information obtained from multiple sources (e.g., user/privileges scan, data scan, etc.) and provide comprehensive results and remedial actions for addressing the security risks. The technology can detect malicious queries, such as queries that can cause injection attacks, while, from a performance perspective, ensuring that all databases are in a healthy state, such as not being overloaded and operating in an expected manner. The present technology improves the performance in security of cloud databases.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
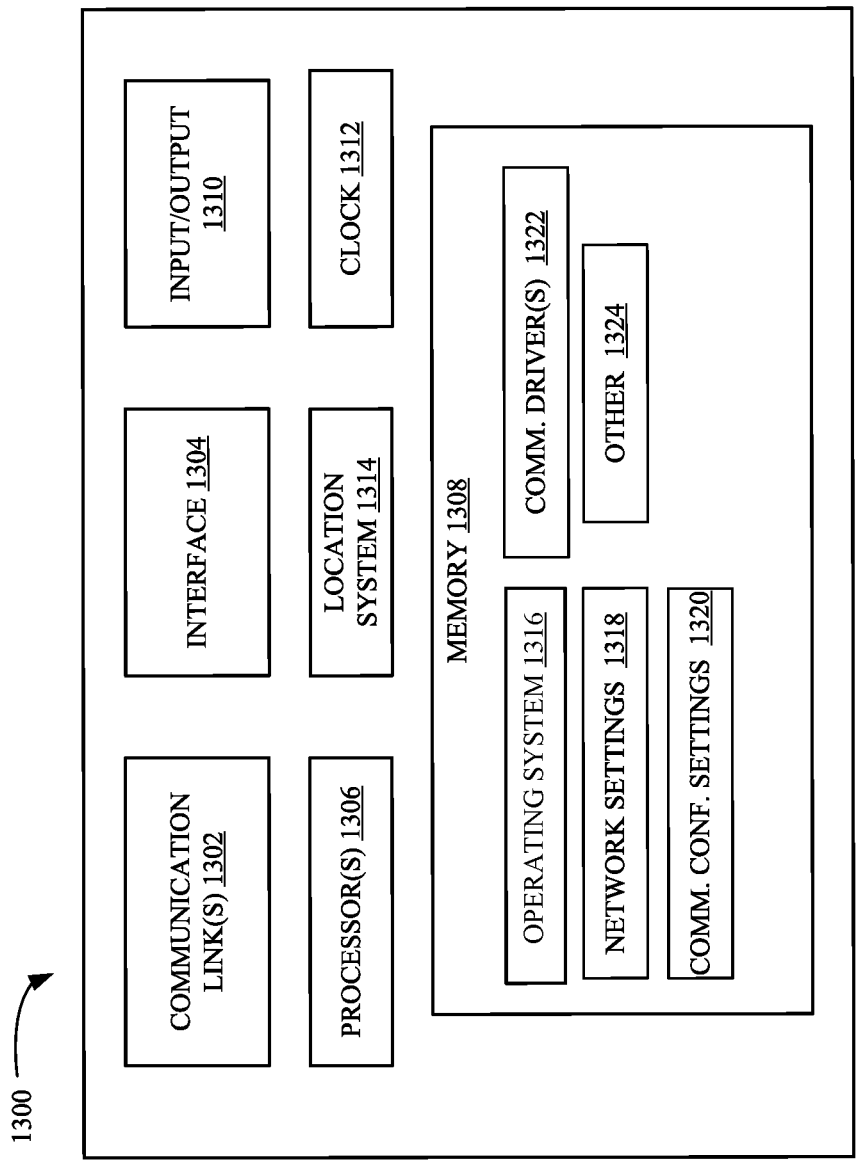
FIG. 13 is a simplified block diagram of one example of a client device.
Figure 14:
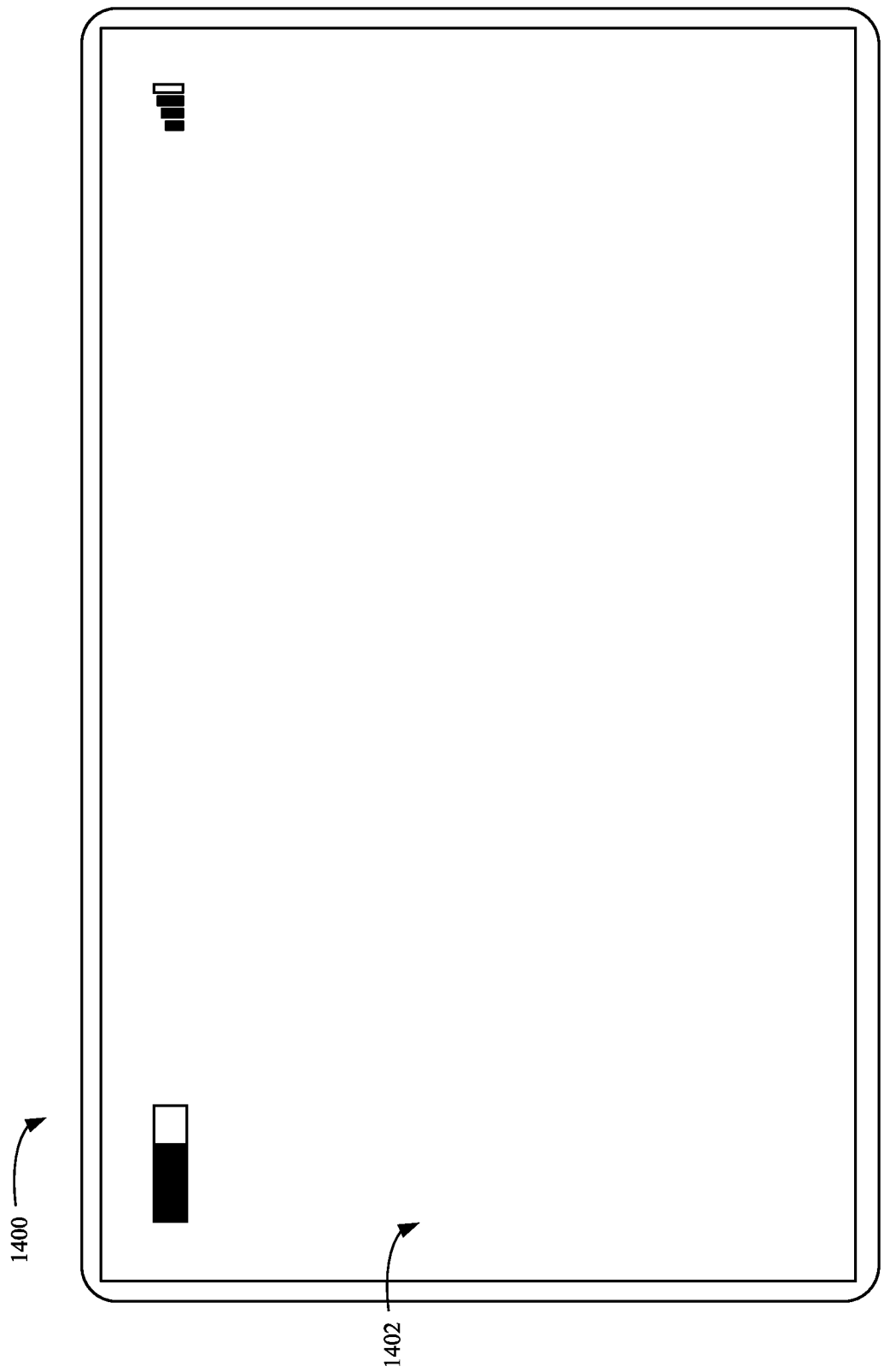
FIG. 14 illustrates an example of a handheld or mobile device.

FIG. 13 is a simplified block diagram of one example of a client device 1300, such as a handheld or mobile device, in which the present system (or parts of the present system) can be deployed. FIG. 14 illustrates an example of a handheld or mobile device.

One or more communication links 1302 allows device 1300 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1304. Interface 1304 and communication links 1302 communicate with one or more processors 1306 (which can include processors or servers described with respect to the figures) along a communication bus (not shown in FIG. 26), that can also be connected to memory 1308 and input/output (I/O) components 1310, as well as clock 1312 and a location system 1314.

Components 1310 facilitate input and output operations for device 1300, and can include input components such as microphones, touch screens, buttons, touch sensors, optical sensors, proximity sensors, orientation sensors, accelerometers. Components 1310 can include output components such as a display device, a speaker, and or a printer port.

Clock 1312 includes, in one example, a real time clock component that outputs a time and date, and can provide timing functions for processor 1306. Location system 1314 outputs a current geographic location of device 1300 and can includes a global positioning system (GPS) receiver, a LORAN system, a dead reckoning system, a cellular triangulation system, or other positioning system. Memory 1308 stores an operating system 1316, network applications and corresponding configuration settings 1318, communication configuration settings 1320, communication drivers 1322, and can include other items 1324. Examples of memory 1308 include types of tangible volatile and non-volatile computer-readable memory devices. Memory 1308 can also include computer storage media that stores computer readable instructions that, when executed by processor 1306, cause the processor to perform computer-implemented steps or functions according to the instructions. Processor 1306 can be activated by other components to facilitate functionality of those components as well.

FIG. 14 illustrates one example of a tablet computer 1400 having a display screen 1452, such as a touch screen or a stylus or pen-enabled interface. Screen 1402 can also provide a virtual keyboard and/or can be attached to a keyboard or other user input device through a mechanism, such as a wired or wireless link. Alternatively, or in addition, computer 1400 can receive voice inputs.

Figure 15:
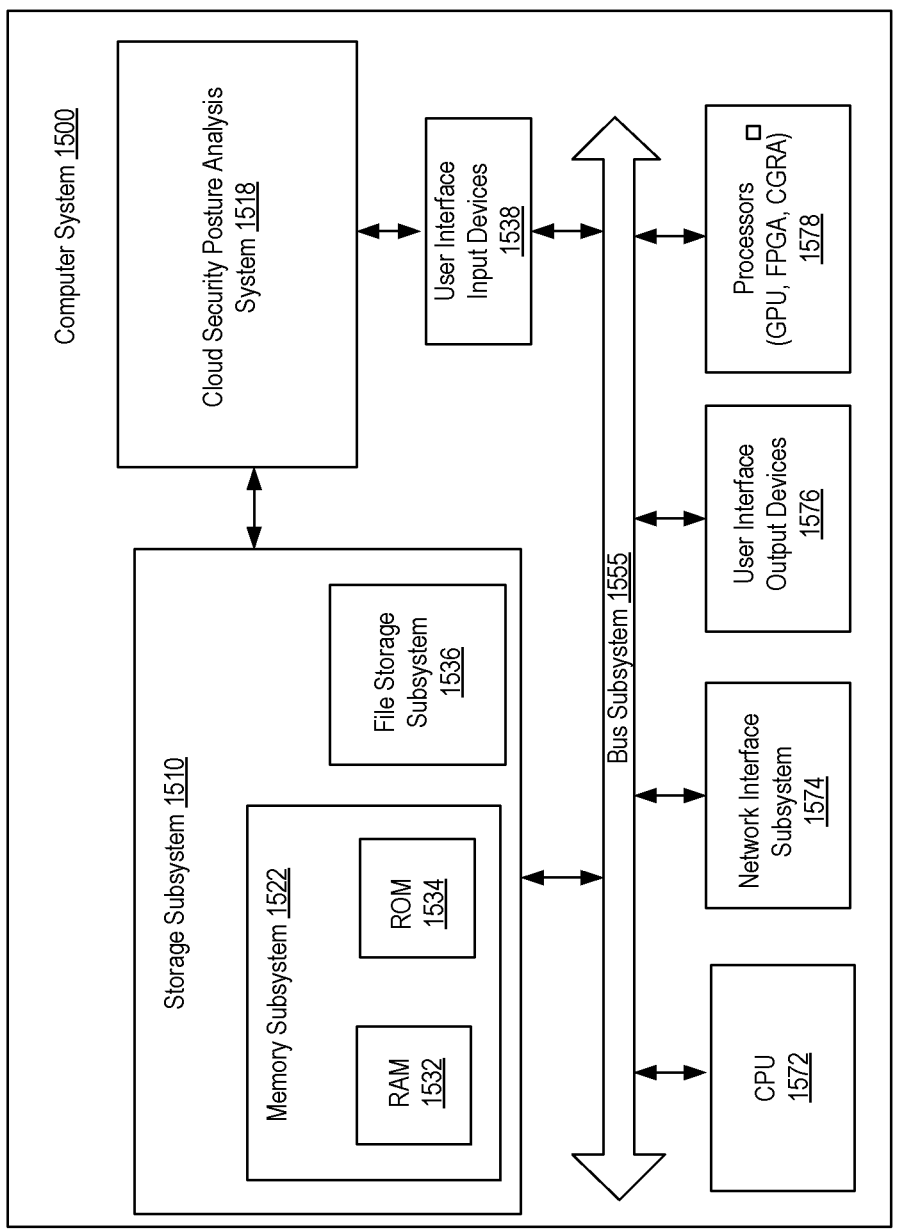
FIG. 15 shows an example computer system.

FIG. 15 shows an example computer system 1500 that can be used to implement the technology disclosed. Computer system 1500 includes at least one central processing unit (CPU) 1572 that communicates with a number of peripheral devices via bus subsystem 1555. These peripheral devices can include a storage subsystem 1510 including, for example, memory devices and a file storage subsystem 1536, user interface input devices 1538, user interface output devices 1576, and a network interface subsystem 1574. The input and output devices allow user interaction with computer system 1500. Network interface subsystem 1574 provides an interface to outside networks, including an interface to corresponding interface devices in other computer systems.

In one implementation, cloud security posture analysis system 1518 is communicably linked to the storage subsystem 1510 and the user interface input devices 1538.

User interface input devices 1538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1500.

User interface output devices 1576 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1500 to the user or to another machine or computer system.

Storage subsystem 1510 stores programming and data constructs that provide the functionality of some or all of the modules and methods described herein. These software modules are generally executed by processors 1578.

Processors 1578 can be graphics processing units (GPUs), field-programmable gate arrays (FPGAs), application-specific integrated circuits (ASICs), and/or coarse-grained reconfigurable architectures (CGRAs). Processors 1578 can be hosted by a deep learning cloud platform such as Google Cloud Platform™, Xilinx™, and Cirrascale™ Examples of processors 1578 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1522 used in the storage subsystem 1510 can include a number of memories including a main random access memory (RAM) 1532 for storage of instructions and data during program execution and a read only memory (ROM) 1534 in which fixed instructions are stored.

A file storage subsystem 1536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1536 in the storage subsystem 1510, or in other machines accessible by the processor.

Bus subsystem 1555 provides a mechanism for letting the various components and subsystems of computer system 1500 communicate with each other as intended. Although bus subsystem 1555 is shown schematically as a single bus, alternative implementations of the bus subsystem can use multiple busses.

Computer system 1500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1500 depicted in FIG. 15 is intended only as a specific example for purposes of illustrating the preferred implementations of the present invention. Many other configurations of computer system 1500 are possible having more or less components than the computer system depicted in FIG. 15.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of detecting security posture of a cloud environment, the computer-implemented method comprising:

detecting a triggering criterion;

in response to the triggering criterion, automatically discovering a plurality of databases in the cloud environment;

configuring an orchestration engine to deploy a plurality of log analyzer microservices on the plurality of databases, each log analyzer microservice, of the plurality of log analyzer microservices, being configured to scan a respective database log that represents database activities on a respective database of the plurality of databases;

receiving analysis results from the plurality of log analyzer microservices, the analysis results representing detection of at least one of a performance criterion or a security criterion in one or more databases of the plurality of databases; and generating an action signal representing the analysis results.

2. The computer-implemented method of claim 1, wherein executing the query comprises:

obtaining database configuration information, for each database, indicating whether a database log generator is enabled on the database; and identifying the plurality of databases based on the database configuration information.

3. The computer-implemented method of claim 2, and further comprising deploying the plurality of log analyzer microservices on the plurality of databases in parallel.

4. The computer-implemented method of claim 1, and further comprising:

receiving a request to on-board a cloud account in the cloud environment, wherein the cloud account includes the plurality of databases, each respective database, of the plurality of databases, including a database log generator configured to generate the respective database log that represents the database activities on the respective database; and detecting the triggering criterion based on the on-boarding of the cloud account.

5. The computer-implemented method of claim 1, wherein the respective database log comprises at least one of an audit log or a transaction log.

6. The computer-implemented method of claim 5, wherein the respective database log comprises a slow query log that records details of queries that take more than a threshold amount of time to execute on the respective database.

7. The computer-implemented method of claim 6, wherein each log analyzer microservice is configured to analyze the respective database log based on one or more of:

a query execution time, a sensitive data profile, a user permission associated with a data access request in the respective database, or a time series pattern of queries representing at least one of a query count, a query type, or a query user.

8. The computer-implemented method of claim 1, and further comprising:

detecting at least one database issue based on the at least one of a performance criterion or a security criterion, wherein generating the action signal comprises controlling a remedial action component to perform a remedial action relative to the database issue.

9. The computer-implemented method of claim 8, wherein the at least one database issue comprises a malicious query.

10. The computer-implemented method of claim 9, wherein the malicious query comprises a query to sensitive data that is executed more than a threshold number of times.

11. The computer-implemented method of claim 1, and further comprising determining that the database activities match a pre-defined risk signature.

12. A computing system comprising:

at least one processor; and memory storing instructions executable by the at least one processor, wherein the instructions, when executed, cause the computing system to:

detect a triggering criterion;

in response to the triggering criterion, automatically discover a plurality of databases in a cloud environment;

configure an orchestration engine to deploy a plurality of log analyzer microservices on the plurality of databases, each log analyzer microservice, of the plurality of log analyzer microservices, being configured to scan a respective database log that represents database activities on a respective database of the plurality of databases;

receive analysis results from the plurality of log analyzer microservices, the analysis results representing detection of at least one of a performance criterion or a security criterion in one or more databases of the plurality of databases; and generate an action signal representing the analysis results.

13. The computing system of claim 12, wherein the instructions, when executed, cause the computing system to:

obtain database configuration information, for each database, indicating whether a database log generator is enabled on the database; and identify the plurality of databases based on the database configuration information.

14. The computing system of claim 12, wherein the instructions, when executed, cause the computing system to:

deploy the plurality of log analyzer microservices on the plurality of databases in parallel.

15. The computing system of claim 12, wherein each log analyzer microservice is configured to analyze the respective database log based on one or more of:

a query execution time, a sensitive data profile, a user permission associated with a data access request in the respective database, or a time series pattern of queries representing at least one of a query count, a query type, or a query user.

16. The computing system of claim 12, wherein the instructions, when executed, cause the computing system to determine that the database activities match a pre-defined risk signature.

17. A computer-implemented method of detecting security posture of a cloud environment, the computer-implemented method comprising:

automatically discovering a plurality of databases in the cloud environment in response to a triggering criterion;

receiving a request to analyze a particular database from among the plurality of databases in the cloud environment;

parsing, using a log analyzer microservice from among a plurality of microservices that were deployed by an orchestration engine on the plurality of databases, a database query log corresponding to the particular database to obtain a parser result, wherein the database query log includes a set of log entries representing database queries on the particular database, and each log entry of the set of log entries identifies a requestor and a target dataset on the particular database;

based on parsing the database query log, identifying one or more query instance that match a pre-defined risk signature;

generating an analysis result by the log analyzer microservice representing the one or more query instance that match the pre-defined risk signature; and generating an output representing the analysis results.

18. The computer-implemented method of claim 17, wherein the pre-defined risk signature defines a threshold level of access attempts of sensitive data by a particular requestor.

19. The computer-implemented method of claim 17, wherein the pre-defined risk signature comprises one or more of:
- a query execution time,
- a sensitive data profile, or
- a user permission associated with a data access in the particular database.

20. The computer-implemented method of claim 17, and further comprising:
- detecting at least one database issue based on at least one of a performance criterion or a security criterion; and
- performing a remedial action relative to the database issue.

\* \* \* \* \*